United States Patent
Gao et al.

(10) Patent No.: US 11,777,745 B2
(45) Date of Patent: Oct. 3, 2023

(54) CLOUD-SIDE COLLABORATIVE MULTI-MODE PRIVATE DATA CIRCULATION METHOD BASED ON SMART CONTRACT

(71) Applicant: Zhejiang Lab, Zhejiang (CN)

(72) Inventors: Feng Gao, Zhejiang (CN); Wenyuan Bai, Zhejiang (CN)

(73) Assignee: Zhejiang Lab, Zhejiang (CN)

( * ) Notice: Subject to any disclaimer, the term of this patent is extended or adjusted under 35 U.S.C. 154(b) by 0 days.

(21) Appl. No.: 17/885,556

(22) Filed: Aug. 11, 2022

(65) Prior Publication Data

US 2023/0041862 A1 Feb. 9, 2023

Related U.S. Application Data

(63) Continuation of application No. PCT/CN2022/091909, filed on May 10, 2022.

(30) Foreign Application Priority Data

Aug. 3, 2021 (CN) .......................... 202110886663.8

(51) Int. Cl.
*H04L 9/32* (2006.01)
*H04L 9/00* (2022.01)
*H04L 9/30* (2006.01)
(52) U.S. Cl.
CPC .............. *H04L 9/3268* (2013.01); *H04L 9/30* (2013.01); *H04L 9/50* (2022.05)
(58) Field of Classification Search
None
See application file for complete search history.

(56) References Cited

U.S. PATENT DOCUMENTS

2020/0195621 A1* 6/2020 Li .......................... H04L 9/0822
2020/0304318 A1* 9/2020 Kravitz ................. H04W 12/06
(Continued)

FOREIGN PATENT DOCUMENTS

CN 111914269 11/2020

OTHER PUBLICATIONS

Lyu, J., et al., Aug. 2019. A secure decentralized trustless E-voting system based on smart contract. In 2019 18th IEEE International Conference On Trust, Security And Privacy In Computing And Communications/13th IEEE International Conference On Big Da (Year: 2019).*

(Continued)

*Primary Examiner* — Luu T Pham
*Assistant Examiner* — Edward X Long
(74) *Attorney, Agent, or Firm* — JCIPRNET

(57) ABSTRACT

The present invention discloses a cloud-side collaborative multi-mode private data circulation method based on a smart contract, including: S1, a system is initialized; S2, the original data are encrypted into private data, an encryption certificate z' for storage is generated, and z' includes metadata and a data certificate key'; S3, the DO calls a smart contract program to realize uplink of the encryption certificate z' and releases z' to a block chain through a smart contract, wherein the smart contract is open to all user accounts; S4, rapid data circulation is realized: when DO releases the data certificate, DU has been identified, a DU's account $ID_{DU}$ is set through an access policy, the DU obtains an encryption key for data access by executing a smart contract and a key algorithm, private data are obtained through metadata and decrypted to obtain a plaintext; and S5, the data circulation is confirmed.

6 Claims, 2 Drawing Sheets

(56) References Cited

U.S. PATENT DOCUMENTS

2021/0256096 A1* 8/2021 Johnson ................ G06F 21/105
2021/0297268 A1* 9/2021 Weng .................... H04L 9/0838

OTHER PUBLICATIONS

Al-Bassam, M., Apr. 2017. SCPKI: A smart contract-based PKI and identity system. In Proceedings of the ACM Workshop on Blockchain, Cryptocurrencies and Contracts (pp. 35-40). (Year: 2017).*
"Written Opinion of the International Searching Authority (Form PCT/ISA/237) of PCT/CN2022/091909," dated Jun. 29, 2022, with English translation thereof, pp. 1-10.

* cited by examiner

| Algorithm: release metadata |
| --- |
| Input: metadata, data's identifier |
| Output: null |
| 1. if verify(DO's account) = = false then
2.    throw
3. end
4. else
5.    serialize(metadata)
6.    break
7. end |

FIG. 2

| Algorithm: extract an encryption storage certificate z' |
| --- |
| Input: DU's Account
Output: z' |
| 1. if find(DU's account) != null
2.    if verify(DU's account) == false then
3.       throw
4.    end
5. end
6. else
7.    data = get_data_from_tx()
8.    z' = unserialize(data)
9.    return z'
10. end |

FIG. 3

CLOUD-SIDE COLLABORATIVE MULTI-MODE PRIVATE DATA CIRCULATION METHOD BASED ON SMART CONTRACT

CROSS-REFERENCE TO RELATED APPLICATIONS

This application is a continuation of international PCT application serial no. PCT/CN2022/091909, filed on May 10, 2022, which claims the priority benefit of China application no. 202110886663.8, filed on Aug. 3, 2021. The entirety of each of the above-mentioned patent applications is hereby incorporated by reference herein and made a part of this specification.

TECHNICAL FIELD

The present invention relates to the fields of cryptographic technology, edge computing technology and block chain technology, in particular to a private data safe circulation method based on cloud-side collaboration.

BACKGROUND

With the construction of economic digitalization, government digitalization and enterprise digitalization, data has become an important core asset of governments and enterprises. However, data security incidents are also occurring at high frequency, data "streaking" has brought substantial losses of assets and reputation to enterprises, and the public is deeply troubled by privacy exposure, harassment and fraud. The Data Security Law provides a legal guarantee for digital construction and points out a development direction. All units and individuals concerned should establish and improve a data security management system according to law when collecting, storing, using, processing, transmitting, providing and disclosing data resources, and they should also take corresponding technical measures to ensure data security. Due to the characteristics of easy copying and tampering of data itself, a prior art of data circulation lacks the abilities of "discoverability, supervision, protection and manageability", resulting in very prominent phenomena such as "isolated data island" and "data chimney" in data application scenarios, which seriously hinder the value generation of data. According to the requirements of the Data Security Law, it is urgent to build a wide-area scenario-oriented security protection system throughout a data life cycle, identify the responsible body of data security protection, and improve the construction of a data security system.

SUMMARY

In order to overcome the deficiencies of the prior art, build various modes of data circulation method from a perspective of safe data circulation based on a cloud-side collaboration technology and a block chain smart contract technology, realize discoverable, supervise-able, and protectable data circulation between a Data Owner (DO) and a Data User (DU) under a condition of private data protection and achieve a security governance framework throughout a data life cycle, the present invention uses a technical solution as follows:

A cloud-side collaborative multi-mode private data circulation method based on a smart contract includes the following steps:

S1, a system is initialized, including the following steps:
S11, initialization of a CP_ABE key algorithm is completed by building a Key-Policy as a Service (KaaS) to obtain a public system key (PSK) and a master secret key (MSK);
S12, a user account is created for each user, including a user account ID, a corresponding public key $ID_{pub\text{-}key}$ and a private key $ID_{pri\text{-}key}$; the user account includes a data owner (DO) and a data user (DU);
S2, the DO symmetrically encrypts and signs original data into private data, an encryption certificate z' for cloud storage is generated, and the z' includes metadata and a data certificate key';
S3, the DO calls a smart contract program to realize uplink of an encryption certificate z', the DO releases the z' to a block chain through the smart contract which is open to all user accounts;
S4, rapid data circulation is realized: when the DO releases the data certificate, the DU has been identified, a DU's account $ID_{DU}$ is set through the access policy, the DU obtains an encryption key for data access by executing a smart contract and a CP_ABE key algorithm, and private data are obtained through metadata and decrypted to obtain a plaintext, including the following steps:
S411, the smart contract is executed for a DU's account to obtain z';
S412, a request is sent to KaaS through the smart contract to apply for a user secret key (USK);
S413, a CP-ABE key algorithm is executed by the KaaS, the PSK, the MSK and the DU's account $ID_{DU}$ are inputted to generate a USK, the USK is encrypted through the public key $DU_{pub\text{-}key}$ of the DU, i.e., USK'=enc (USK, $DU_{pub\text{-}key}$), and the USK' is released to a block chain through the smart contract which is only accessible to DU;
S414, the smart contract is executed by the DU to obtain the USK', and the USK is obtained by decrypting the private data through a private key $DU_{pri\text{-}key}$ of the DU;
S415, the data certificate key' in the z' is decrypted by the DU through the USK to obtain key=dec_cpabe (key', PSK, USK); and
S416, an address of the private data cloud storage is obtained by the DU through the metadata in the z', the private data are downloaded and decrypted by using AES through the key to obtain the original data, and data circulation is completed; and
S5, the data circulation is confirmed: the DO submits a transaction certificate of data circulation, and confirms that the data circulation is completed.

Further, in the S11, the initialization algorithm is a randomized algorithm which is executed on a trusted key distribution center, a security coefficient γ and an attribute space U are inputted into the key algorithm, and the key algorithm is executed to obtain the PSK and the MSK of the algorithm:

Setup (γ, policy)→(PSK,MSK)

wherein an access policy is composed of elements in the U through "and", "or" and other operations.

Further, the S2 includes the following steps:
S21, the DO applies to Kaas for PSK; and
S22, the DO obtains the data certificate key' from the PSK and an encryption key, i.e., key'=enc_cpabe (key, PSK, policy), while z'=[metadata,key'], including the following steps:
S221, the DO generates metadata (including a target file identifier, a storage address URL and a hash, business type and the like) based on the original data, a random number is generated as an encryption key of the original data, the original data of the DO are encrypted by using AES through the encryption key to form private data, and the private data are stored in a cloud storage space;

S222, the DO generates an access policy based on a user account ID set by a platform, a key'=enc_cpabe (key, PSK,policy) is generated based on a CP-ABE key algorithm, while z'=[metadata,key']; the key algorithm is executed by the DO, the algorithm inputs a public system key PSK, a message key to be encrypted and the access policy associated with the access policy to generate a data certificate key' based on attribute encryption, and the data certificate key' can be decrypted only by a requester who satisfies the access policy.

Further, in the S2, the original data are encrypted symmetrically and signed into the private data by the DO and saved on a cloud side, an encryption certificate z' for cloud storage is generated; in the S4, the DU obtains the private data from the cloud side through metadata and decrypts the private data to obtain a plaintext.

Further, in the S414, the obtained USK is saved; in the S412, whether the USK based on the CP-ABE key algorithm is saved is checked in the DU's account, and if not, a request is sent to KaaS through the smart contract to apply for the USK; if present, skip to S415.

Further, in the S12, a supervision committee (SC) is further built, including a SC's account $ID_{SC}$, a SC's public key $SC_{pub\text{-}key}$ and a SC's private key $SC_{pri\text{-}key}$.

Further, the policy=$ID_{DU} \cup ID_{SC}$.

Further, broadcasting data circulation is realized in the S4: when the DO releases a data certificate, the DU has not been identified, the DU judges that the DU is interested in a certain data item when retrieving the block chain and browsing the metadata, a file reading request is published through the smart contract, and data circulation is completed if an authority passes a review after the DO executes the smart contract, including the following steps:

S421, when executing a consensus algorithm, the DU calls a smart contract, retrieves a block chain, browses metadata and checks conditions related to a data processing service, and all related nodes of the block chain can verify the correctness of metadata based on the openness of the block chain;

S422, the DU judges that a certain data item is related to the DU and sends an access request to the DO through the smart contract, wherein the access request includes an identifier name, a hashed value and the like of a target file;

S423, the DO submits a policy=$((t \geq t_{start} \cap t \leq t_{end} \cap ID_{DU}) \cup ID_{SC})$ with a time attribute to the block chain through the smart contract, t, $t_{start}$ and $t_{end}$ represent a current contract execution time, a circulation cycle starting time and a circulation cycle ending time respectively, the $ID_{DU}$ represents a DU's account, the $ID_{SC}$ represents a SC's account, and the smart contract access authority is only open to the SC;

S424, the SC executes the smart contract, obtains an attribute collection policy from a block chain, and verifies the validity of the policy, if the validity fails, the DU is informed, and the process is ended;

S425, the DO executes the CP-ABE key algorithm, and the PSK, the file encryption key and the access policy are inputted to generate a data certificate key'=enc_cpabe (key,PSK,plicy) which is open to all accounts;

S426, the KaaS executes the CP-ABE key algorithm, and the PSK, the MSK and the access policy are inputted to generate a USK; the USK is encrypted through the public key $DU_{pub\text{-}key}$ of the DU, i.e., USK'=enc (USK, $DU_{pub\text{-}key}$), and the USK' is released to a block chain through the smart contract which is only accessible to DU;

S427, the DU executes a smart contract to obtain a USK', and decrypts the private data through the private key $DU_{pri\text{-}key}$ of the USK' to obtain a USK;

S428, the DU executes the CP-ABE key algorithm, the PSK, USK and key' are inputted, an encryption key is obtained through decryption as long as the DU's account satisfies an enabling characteristic in the access policy within an effective time limit, the DU obtains the address of the private data cloud storage through the metadata in the z', the file is downloaded and decrypted by using AES through the key to obtain the original data, and data circulation is completed.

Further, the policy=$ID_{SC}$.

Further, data supervision is realized in the S4: the SC decrypts private data corresponding to a transaction time, a private data sharing initiator, a private data receiver and metadata based on the metadata of the block chain because the policy enables the SC's account in all the data circulation processes, and verifies the authenticity and other contents of the private data, including the following steps:

S431, the SC saves the PSK and MSK, and z'=[metadata, key'] is obtained by retrieving the block chain;

S432, as the policy in the fast mode and broadcasting mode has been set to a supervision committee enabling policy, decryption is executed based on the USK corresponding to the SC's account to obtain key=dec_cpabe (key', PSK, USK); and S433, the SC decrypts the AES based on the key and the private data obtained by URL stored in the metadata to obtain the original data.

The key algorithm is a key algorithm based on attribute-based encryption CP-ABE.

The advantages and beneficial effects of the present invention are as follows:

According to the wide-area scenario-oriented cloud-side collaboration technology of the present invention, the security of an edge side is lower than that of a cloud side, but the demand for data circulation is very high; cloud native services such as encrypted data storage, key-policy and supervision committee are built on the cloud side with a higher security to complete a cloud-side data circulation mechanism in collaboration with the edge side; according to different situations of data circulation, different modes such as rapid mode, broadcasting mode, supervision mode and the like are proposed based on attribute-based encryption (CP-ABE), so that safe and efficient circulation under complex scenarios is realized.

BRIEF DESCRIPTION OF THE DRAWINGS

FIG. 2 is a flow chart of releasing metadata by the DO in the present invention.

FIG. 3 is a flow chart of extracting a data storage certificate z' by the DU in the present invention.

DETAILED DESCRIPTION OF THE EMBODIMENTS

Figure 1:
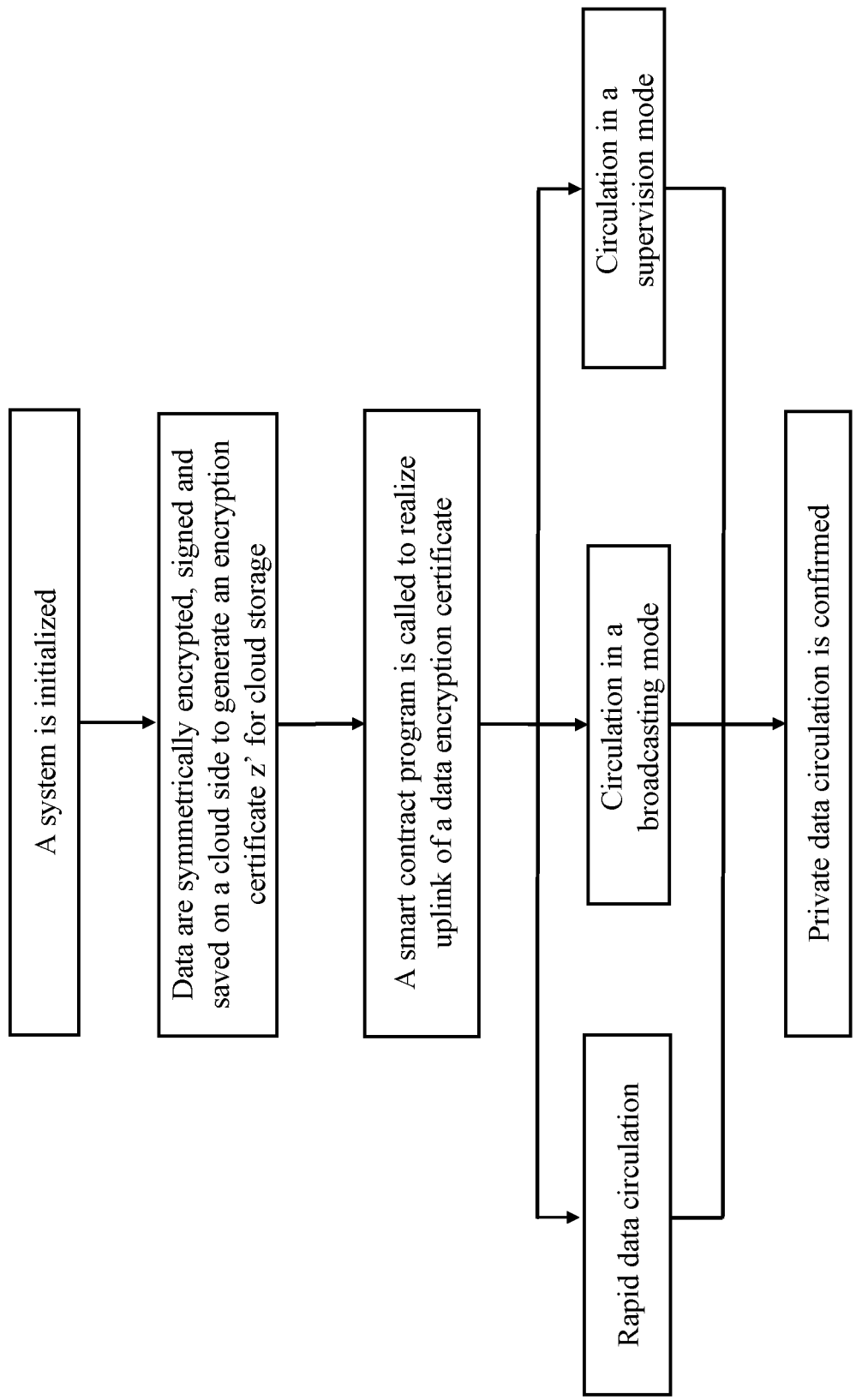
FIG. 1 is a flow chart of the method of the present invention.

The detailed description of the embodiments of the present invention will be described in detail below in association with the accompanying drawings. It should be understood that the detailed description of the embodiments described herein are only used to describe and interpret, rather than to limit, the present invention.

The present invention uses the smart contract as an important means of authorized data access. The smart contract is a technology closely coupled with a block chain. Due to the consistency of a block chain state, the smart contract will be executed on all consensus nodes. Therefore, the present invention designs a cloud-side collaborative multi-mode private data circulation method based on a smart contract to realize supervisable circulation between a Data Owner (DO) and a Data User (DU), as shown in FIG. 1, including the following steps:

S1, a system is initialized;

S11, initialization of a CP_ABE algorithm is completed by building a Key-Policy as a Service (KaaS); the initialization algorithm is a randomized algorithm which is executed on a trusted key distribution center, a security coefficient γ and an attribute space U are inputted into the algorithm, elements in the attribute space U become a policy through "and", "or" and other operations, and the policy is executed to obtain a PSK and a MSK of the algorithm Setup (γ, policy)→(PSK,MSK)

S12, a user account is created for each user, comprising a user account ID, a corresponding public key $ID_{pub-key}$ and a private key $ID_{pri-key}$; a supervision committee (SC) is built, and a SC's public key $SC_{pub-key}$ and a SC's private key $SC_{pri-key}$ are allocated.

S2, the DO saves data on the cloud side by using symmetric encryption and signature, an encryption certificate z' for cloud storage is generated, and the z' includes metadata and key information for data encryption.

S21, the DO applies to Kaas for PSK.

S22, the DO obtains the data certificate key' from the PSK and an encryption key, i.e., key'=enc_cpabe (key, PSK, policy), while z'=[metadata,key'].

S221, the DO generates metadata (including a target file identifier, a storage address URL and a hash, business type and the like) based on the original data, a random number is generated as a file encryption key, the original data of the DO are encrypted by using AES through the encryption key to form a private file, and the private file is stored in a cloud storage space.

S222, the DO generates an access policy based on a user account ID set by a platform, the policy is composed of the elements in the attribute space U through "and", "or" and other operations, policy=$ID_{DU} \cup ID_{SC}$ if it is a rapid mode; policy=$ID_{SC}$ if it is a broadcasting mode. A key'=enc_cpabe (key,PSK,policy) is generated based on the CP-ABE algorithm, while z'=[metadata,key']; the encryption algorithm is executed by the DO, the PSK, a message key to be encrypted and the access policy associated with the access policy are inputted into the algorithm to generate a ciphertext key' based on attribute encryption, and the ciphertext key' can be decrypted only by a requester who satisfies the access policy.

S3, the DO calls a smart contract program to realize uplink of the encryption certificate z', and the DO releases the z' to a chain through the smart contract which is open to all user accounts. The smart contract is as shown in FIG. 2.

S4, the system realizes three modes of data circulation: rapid data circulation, broadcasting mode, and supervision mode, and the following situations are included.

S41, rapid data circulation mode: when the DO releases the data certificate, the DU has been identified, a DU's account $ID_{DU}$ can be set through the access policy, the DU obtains a symmetric key for data access by executing a smart contract and a CP_ABE decryption algorithm, and a private file is obtained from a cloud side and decrypted to obtain a plaintext.

S411, the smart contract is executed for a DU's account (a process is as shown in FIG. 3) to obtain z'.

S412, whether the USK based on CP-ABE is saved is checked in the DU's account, and if not, a request is sent to KaaS through the smart contract to apply for the USK; if present, skip to step S415.

S413, the CP-ABE key algorithm is executed by the KaaS, the PSK, the MSK and the DU's account $ID_{DU}$ are inputted to generate a USK; the USK is encrypted through the public key $DU_{pub-key}$ of the DU, i.e., USK'=enc (USK, $DU_{pub-key}$), and the USK' is released to a block chain through the smart contract which is only accessible to the DU.

S414, the smart contract is executed by the DU to obtain the USK', and the USK is obtained and saved by decrypting the private data through the private key $DU_{pri-key}$ of the USK'.

S415, the ciphertext key' in the z' is decrypted through the USK to obtain key=dec−cpabe (key', PSK, USK).

S416, an address of the original data cloud storage is obtained by the DU through z' metadata, the file is downloaded and decrypted by using AES through the key to obtain a file content, and data circulation is completed.

S42, broadcasting data circulation mode: when the DO releases a data certificate, the data user has not been identified, the DU judges that the DU is interested in a certain data item when retrieving the block chain and browsing the metadata, and a file reading request is published through the smart contract. If an authority passes a review after the DO executes the smart contract, a process of S42 proceeds, and data circulation is completed.

S421, when executing a consensus algorithm, the DU calls a smart contract, retrieves a block chain, browses metadata and checks conditions related to a data processing service, and all related nodes of the block chain can verify the correctness of metadata based on the openness of the block chain.

S422, the DU judges that a certain data item is related to the DU and sends an access request to the DO through the smart contract, wherein the access request includes an identifier name, a hashed value and the like of a target file.

S423, the DO submits a policy=$((t \geq t_{start} \cap t \leq t_{end} \cap ID_{DU}) \cup ID_{SC})$ with a time attribute to the block chain through the smart contract, t, $t_{start}$ and $t_{end}$ represent a current contract execution time, a circulation cycle starting time and a circulation cycle ending time respectively, the $ID_{DU}$ represents a DU's account, the $ID_{SC}$ represents a SC's account, and the smart contract access authority is only open to the SC.

S424, the SC executes the smart contract, obtains an attribute collection policy from a chain, and verifies the validity of the policy, if the validity fails, the DU is informed, and the process is ended.

S425, the DO executes the CP-ABE encryption algorithm, and the PSK, the file encryption key and the access policy are inputted to generate a ciphertext key'=enc_cpabe (key, PSK, plicy) which is open to all accounts.

S426, the KaaS executes the CP-ABE key algorithm, and the PSK, the MSK and the policy are inputted to generate a USK; the USK is encrypted through the public key of the DU, i.e., USK'=enc (USK,$DU_{pub-key}$), and the USK' is released to a block chain through the smart contract which is only accessible to DU.

S427, the DU executes a smart contract to obtain the USK', and USK is obtained through the private key $DU_{pri-key}$ of the DU.

S428, the DU executes the CP-ABE decryption algorithm, the PSK, USK and ciphertext key' are inputted, a key is obtained through decryption as long as the DU's account satisfies an enabling characteristic in the ciphertext access policy within an effective time limit, metadata are decrypted, and master data related files are obtained.

S43, data supervision mode: the SC can decrypt a private file corresponding to a transaction time, a private data sharing initiator, a private data receiver and metadata based on the metadata of the block chain because the policy enables the SC's account in all the data circulation processes, and the SC can verify the authenticity and other contents of the private file.

S431, the SC saves the PSK, MSK and a retrieved block chain to obtain z'=[metadata, key'].

S432, as the policy in the fast mode and broadcasting mode has been set to a supervision committee enabling policy, decryption can be executed based on the USK corresponding to the SC's account to obtain key=dec_cpabe (key', PSK, USK).

S433, the SC's account downloads the private file based on the key and a URL stored in the private file in metadata and decrypts the private file by using AES to obtain plaintext information of the private file.

S5, private data circulation is confirmed: in the data circulation mode, the DO submits a transaction certificate of data circulation, and confirms that the data circulation is completed; in the data supervision mode, the SC submits a transaction certificate of data circulation, and confirms that the data circulation is completed.

The above-mentioned embodiments are only used to illustrate, rather than to limit, the technical solution of the present invention. Although the present invention has been described in detail by reference to the foregoing embodiments, those skilled in the art should understand that they can still modify the technical solution recorded in the foregoing embodiments, or make equivalent replacements to some or all of the technical features in the technical solution. These modifications or replacements will not cause the essence of the corresponding technical solution to depart from the scope of the technical solution in the embodiments of the present invention.

What is claimed is:

1. A cloud-side collaborative multi-mode private data circulation method based on a smart contract, comprising:
   initializing a system:
      initializing, by the system, a key algorithm of a Key-Policy as a Service (KaaS) to obtain a public system key (PSK) and a master secret key (MSK); and
      creating, by the system, a user account for each user, wherein the user account comprises a user account identifier (ID), a corresponding public key $ID_{pub-key}$, a private key $ID_{pri-key}$, a data owner (DO), a data user (DU), and a user profile comprising an account $ID_{SC}$, a public key $SC_{pub-key}$, and a private key $SC_{pri-key}$;
   encrypting, by the DO, original data into private data and generating an encryption certificate, wherein the encryption certificate comprises metadata and a data certificate key:
      applying to the KaaS, by the DO, for the PSK; and
      obtaining, by the DO, the data certificate key according to the PSK, an encryption key, and an access policy, comprising:
         generating the metadata based on the original data to form the private data by generating a random number as the encryption key of the original data and encrypting the original data through the encryption key to form the private data, and storing the private data in a cloud storage space; and
         generating the access policy based on the user account ID and generating the data certificate key based on the key algorithm according to a key of a message to be encrypted, the PSK and the access policy;
   uploading, by the DO, the encryption certificate to a block chain by using a smart contract which is accessible to all user accounts;
   determining, by the DO, a data circulation in response to identifying the DU, wherein the determining comprises:
      in response to releasing the data certificate key, setting an account $ID_{DU}$ through the access policy, wherein the DU obtains the encryption key by executing the smart contract and the key algorithm, and the DU obtains the private data through the metadata and decrypts the private data to obtain a plaintext, comprising:
         obtaining the encryption certificate by executing the smart contract for the account $ID_{DU}$;
         sending a request to the KaaS through the smart contract to apply for a user secret key (USK), wherein the USK is generated by the KaaS based on the key algorithm according the PSK, the MSK, and the account $ID_{DU}$, and the USK is encrypted by a public key $DU_{pub-key}$ of the DU and uploaded to a block chain through the smart contract which is only accessible to the DU;
         executing the smart contract to obtain the encrypted USK and obtaining the USK from the encrypted USK through a private key $DU_{pri-key}$ of the DU by the DU;
         decrypting the data certificate key in the encryption certificate by the USK to obtain the encryption key; and
         obtaining the private data through the metadata in the encryption certificate and decrypting the private data through the encryption key to obtain the original data;
   determining, by the DO, the data circulation in response to not identifying the DU and releasing the data certificate key, wherein the DU retrieves the block chain, browses the metadata, and publishes a file reading request through the smart contract, comprising:
      calling the smart contract, retrieving the block chain, and browsing the metadata;
      sending an access request to the DO through the smart contract, wherein the DO submits a policy with a time attribute to the block chain, the time attribute is associated with a current contract execution time t, a circulation cycle start $time_{start}$, and a circulation cycle ending $time_{end}$, wherein the user profile is used to execute the smart contract, obtain a policy from the block chain, verify a validity of the policy, and informs the DU if the validity is fail, wherein the USK is generated by the KaaS based on the key algorithm according the PSK, the MSK, and the access policy, and the USK is encrypted by the public key $DU_{pub-key}$ of the DU and uploaded to the block chain through the smart contract which is only accessible to the DU; and obtaining the encryption key based on the key algorithm according to the PSK, the USK, and the data certificate key through decryption as long as the account $ID_{DU}$ satisfies an enabling characteristic in the access policy within an effective time limit, obtaining the private data through the metadata in the encryption certificate, and decrypting the private data through the encryption key to obtain the original data, wherein the data circulation is completed if an authority passes a review after the DO executes the smart contract; and submitting a transaction certificate of the data circulation and confirming that the data circulation is completed by the DO.

2. The cloud-side collaborative multi-mode private data circulation method based on the smart contract of claim 1, wherein the PSK and the MSK are generated from a parameter γ associated with the access policy, and therein the access policy is further associated with an attribute space U.

3. The cloud-side collaborative multi-mode private data circulation method based on the smart contract of claim 1, wherein the original data are encrypted into the private data by the DO and saved on a cloud side, and the encryption certificate for cloud storage is generated, wherein the DU obtains the private data from the cloud side through the metadata and decrypts the private data to obtain the plaintext.

4. The cloud-side collaborative multi-mode private data circulation method based on the smart contract of claim 1, wherein the obtained USK is saved by the DU, wherein whether the USK based on the key algorithm is saved is checked in the account $ID_{DU}$, if the USK is not saved, a request is sent to the KaaS by the DU through the smart contract to apply for the USK; if the USK is saved, the decrypting the data certificate key in the encryption certificate by the USK to obtain the encryption key is executed by the DU.

5. The cloud-side collaborative multi-mode private data circulation method based on the smart contract of claim 1, wherein the policy is associated with the account $ID_{DU}$ and the account $ID_{SC}$.

6. The cloud-side collaborative multi-mode private data circulation method based on the smart contract of claim 1, wherein the policy is associated with the account $ID_{SC}$.

\* \* \* \* \*